United States Patent [19]
Massarelli et al.

[11] Patent Number: 5,329,272
[45] Date of Patent: Jul. 12, 1994

[54] HEAD-UP DISPLAY DEVICE FOR THE DISPLAY OF DATA ABOARD AUTOMOBILES

[75] Inventors: Liberto Massarelli, Vasto; Vito L. Giordano, Bellaria, both of Italy

[73] Assignee: Societa Italiana Vetro - SIV- S.p.A., San Salvo CH, Italy

[21] Appl. No.: 761,449

[22] Filed: Sep. 18, 1991

[30] Foreign Application Priority Data

Sep. 20, 1990 [IT] Italy .................. 48291 A/90

[51] Int. Cl.⁵ .................................................. B60Q 1/00
[52] U.S. Cl. ...................................... 340/461; 340/980; 345/7; 359/630
[58] Field of Search ............ 340/980, 705:461; 359/630, 632; 353/13, 14; 345/7, 8

[56] References Cited

U.S. PATENT DOCUMENTS

| | | | |
|---|---|---|---|
| 3,887,273 | 6/1975 | Griffiths | 359/630 |
| 3,915,548 | 10/1975 | Opittek et al. | 340/705 |
| 4,305,057 | 12/1981 | Rolston | 340/705 |
| 4,544,243 | 10/1985 | Munnerlyn | 340/705 |
| 4,632,508 | 12/1986 | Connelly | 340/705 |
| 4,711,544 | 12/1987 | Iino et al. | 353/14 |
| 4,740,780 | 4/1988 | Brown et al. | 340/705 |
| 4,804,836 | 2/1989 | Iino | 340/705 |
| 4,847,603 | 7/1989 | Blanchard | 359/630 |
| 4,967,191 | 10/1990 | Iino | 359/630 |
| 4,993,788 | 2/1991 | Steward | 340/705 |
| 5,053,755 | 10/1991 | Smith et al. | 340/980 |

FOREIGN PATENT DOCUMENTS

| | | |
|---|---|---|
| 0229876 | 7/1987 | European Pat. Off. . |
| 0286962 | 10/1988 | European Pat. Off. . |
| 0377773 | 7/1990 | European Pat. Off. . |
| 0420196 | 4/1991 | European Pat. Off. ............ 340/705 |
| 2633067 | 2/1978 | Fed. Rep. of Germany . |
| 1276968 | 10/1961 | France . |
| 2227589 | 11/1974 | France . |
| 2391109 | 12/1978 | France . |
| 8903059 | 4/1989 | World Int. Prop. O. . |

*Primary Examiner*—Brent Swarthout
*Attorney, Agent, or Firm*—Wenderoth, Lind & Ponack

[57] ABSTRACT

A head-up display device for the display of data aboard automobiles, comprising a unit for the generation of the visual information to be displayed; located within the first part of the optical axis of the device, placed substantially parallel to the longest side of the windshield of an automobile; first optical refracting means situated on said optical axis; reflecting means with zero optical power placed substantially at 45° to said first part of the optical axis to deviate by approximately 90° said optical axis on which a second refracting means is located; the second part of said optical axis originated by said reflecting means being directed towards the surface of the windshield at such an angle as to be substantially within the driver's field of view; the arrangement being such that, in a known manner, the surface of the windshield acts as a combiner element of the panorama seen by the driver and the virtual image coming from said unit for the generation of visual information to be displayed.

18 Claims, 4 Drawing Sheets

$$X = \arcsin(H/G)$$

$$Y = \text{arctg}(B/A)$$

HEAD-UP DISPLAY DEVICE FOR THE DISPLAY OF DATA ABOARD AUTOMOBILES

BACKGROUND OF THE INVENTION

1. Field of the Invention

The present invention relates to a head-up display device for the display of data aboard automobiles.

In particular the present invention relates to a HUD (Head-Up Display), which uses the windshield of an automobile as an optical element on which images are combined and replayed to the observer.

2. Description of the Prior Art

Head-up display devices (HUD) are commonly used in the field of military aeronautics in fighter planes, which permit the pilot to observe the in-flight scenario and at the same time to observe instruments, signals, etc., without having to move his eyes from the scene, thus reducing the risks connected with momentary lack of attention to the scenario visible from the front windscreen of the aircraft.

In the field of automobiles, it is equally useful to reduce the causes of distraction for the driver from observation of traffic and the road, due, for example, to keeping an eye on the speedometer, the rev counter, the direction indicator lights (indicators) and the like which are to be found aboard any automobile.

Head-up display devices of an aeronautical type are impractical for automobiles for a number of reasons, among which are included cost and size.

U.S. Pat. No. 4,740,780 to Braun et al. discloses a HUD-type device designed for use aboard automobiles. A similar arrangement is also illustrated and described in the published European patent application No. 0 229 876 in the name of SAZAKI Corporation.

The devices disclosed in these documents are complex and bulky and, as a consequence of the described conditions of use aboard automobiles, require among other things the use of aspherical optical components which are costly and difficult to produce.

In effect, as stated in the two documents mentioned above (the specifications of which are incorporated herein by reference in order to explain the problems involved more clearly), automobiles present problems with respect to the use of HUD devices which greatly differ from those presented by military aeronautics. Specifically, the optical element combining the HUD image and the surrounding scene is the windshield in automobiles, and it must be remembered that the boundary conditions (stereoscopic binocular vision, accommodation of the eye, and "projection" of the HUD image) are different in aeronautics and in commercial automobiles.

In an automobile, the reflection of the sun's light gives rise to problems of contrast which do not occur in military-type aeronautical applications.

SUMMARY OF THE INVENTION

Bearing in mind the above, the object of the present invention is to provide a Head-up display device (HUD) for the display of data aboard commercial automobiles which is particularly compact, simple, easily adjustable according to the height of the driver of the automobile, and which exhibits improved visibility characteristics for the HUD image both in terms of contrast and in terms of image quality from an optical point of view, and which exhibits good characteristics regarding the so-called "eye box".

According to the present invention, a Head-up display device comprises a unit for generating visual information transmitted along a first optical path of the device extending substantially parallel to the longest side of the windshield of the automobile; first refractive optical means situated in Said first optical path; reflecting means having a zero optical power placed substantially at 45° to said first optical path so as to reflect the visual information by approximately 90° along a second optical path in which a second optical refractive means is situated; the second optical path originating from said reflection means being directed towards the surface of the windshield at such an angle that the visual information is reflected substantially within the field of view of the driver; and, in a known manner, the surface of the windshield combining the panorama seen by the driver and the virtual image generated by the unit for generating visual information.

According to the present invention the first refractive means is a negative (diverging) lens and the second refractive means is a positive (converging) lens.

Further, according to the present invention, opposite the exit pupil of the system a contrast element is placed, formed by a semi-transparent net, preferably fastened in a removable manner to allow the front surface of the positive lens to be cleaned.

In addition, the part of the optical system formed by the unit for generating the visual information, the first refractive means and mirror can be rotated around the first optical path either manually or by a motor so as to finely position the image seen by the driver at an optimal position.

BRIEF DESCRIPTION OF THE DRAWINGS

Further aspects and characteristics of the present invention will become clearer from the following description of a preferred embodiment of the present invention, given by way of a non-limiting example, made with reference to the figures of the accompanying drawings, in which.

DETAILED DESCRIPTION OF THE PREFERRED EMBODIMENT

In the following description, it must be noted that the sizes of the various component parts of the HUD device, along with other numerical data, refer to a normal production model of a Lancia "THEMA" automobile. Given that the sizes of the various parts of this automobile are known, on the basis of the numerical data which follows, persons skilled in the art will be capable of designing a HUD device for other makes of automobiles, bearing in mind certain well-known laws of geometrical optics.

Figure 1:
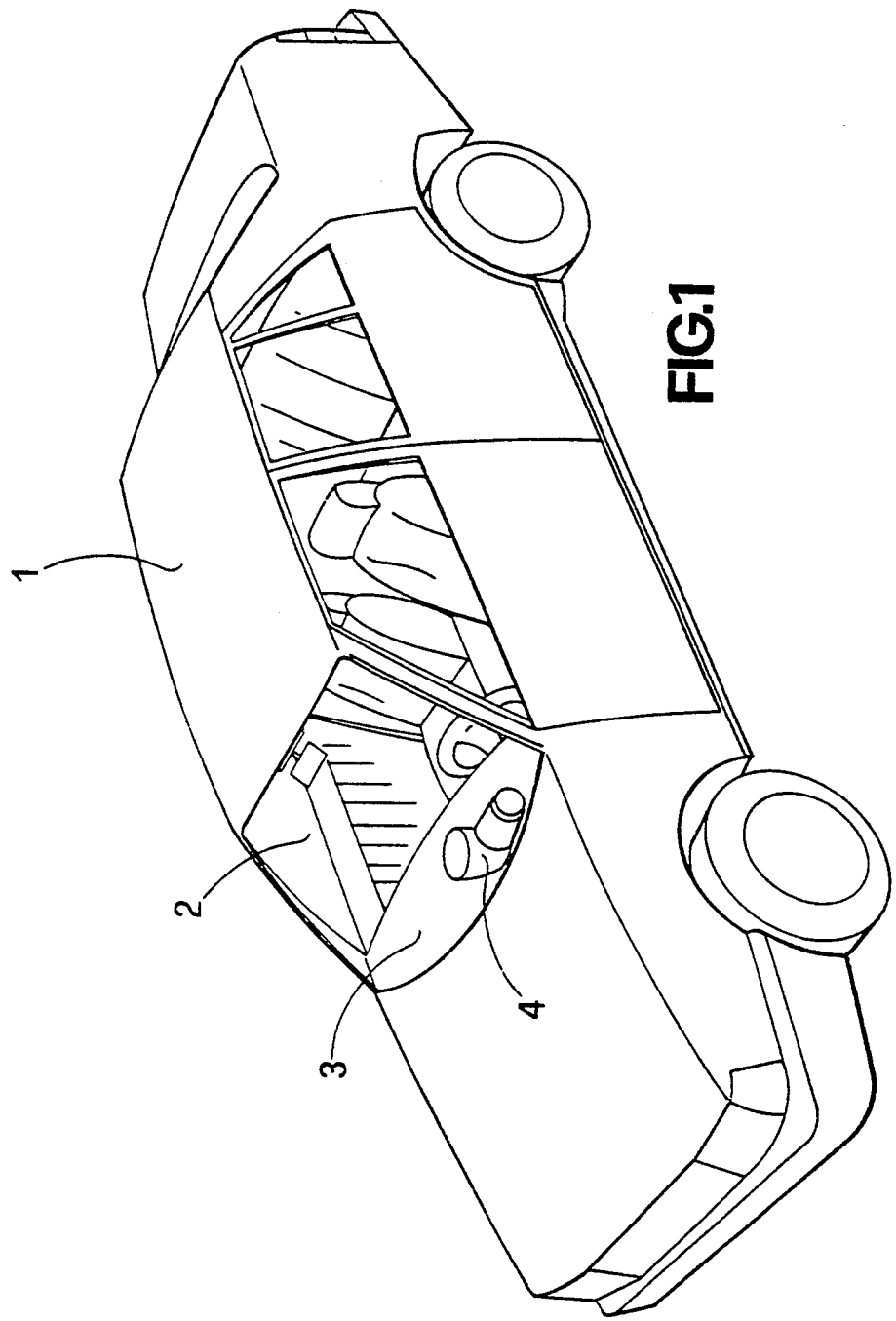
FIG. 1 is a perspective view of a generic automobile in which the device according to the invention has been installed.
Figure 2:
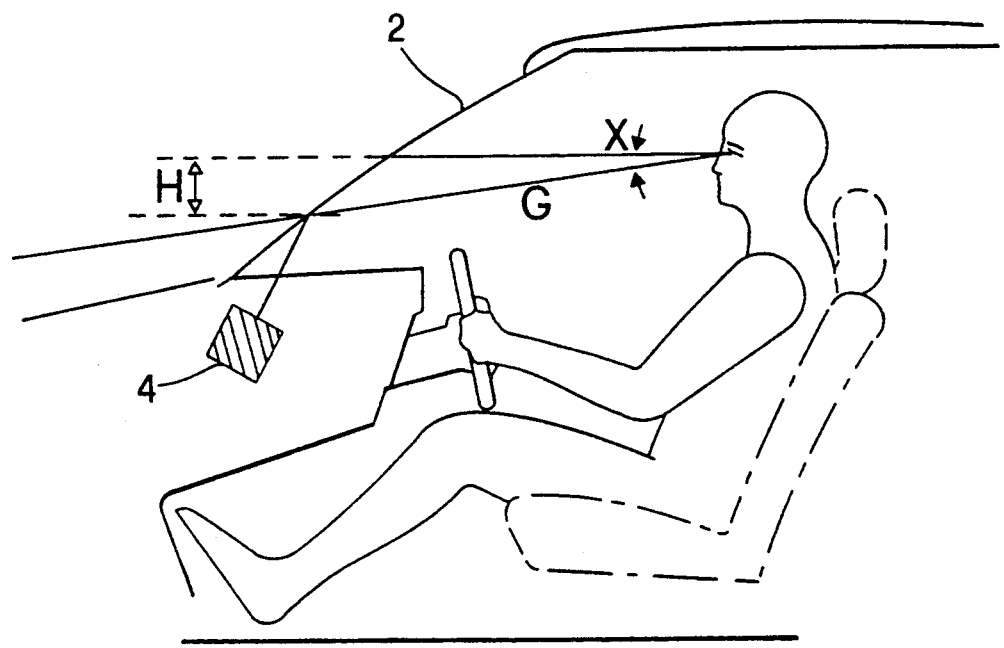
FIG. 2 is a schematic view of the optical paths of the device with respect to a driver situated in a driving position.
Figure 3:
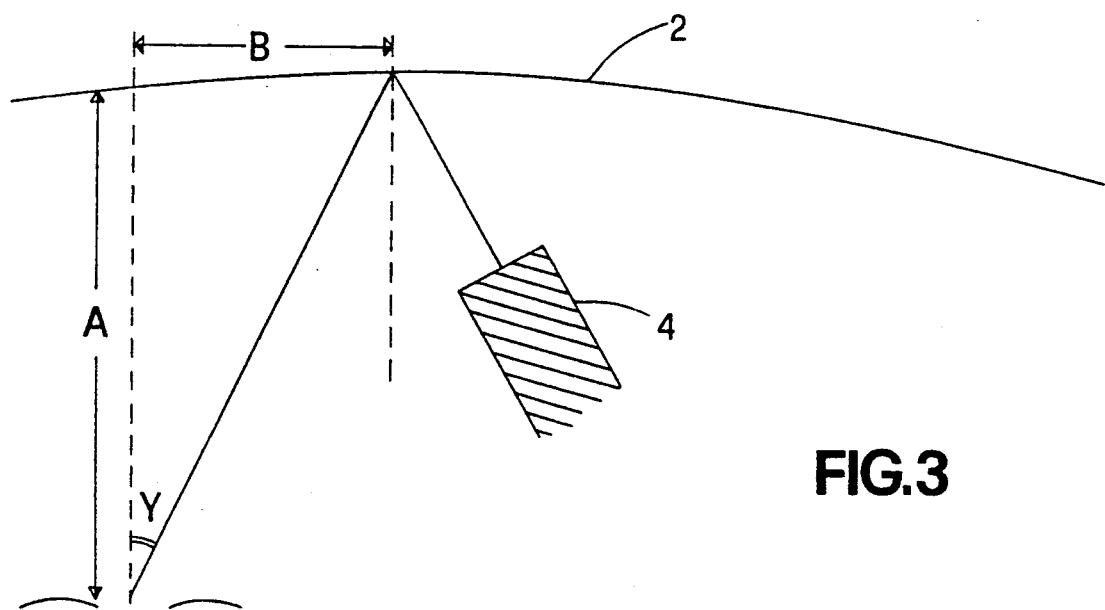
FIG. 3 is a plan view showing the optical paths 2.

FIG. 1 shows an automobile 2 (Lancia, "THEMA") provided with a windshield 2 and a dashboard 3. The optics of the HUD device 4 according to the present invention are mounted within the dashboard 3. As will be seen herebelow, the device 4 projects a virtual image towards the windshield 2, which acts as an image combiner (half reflecting mirror), so that the driver can "see" at the same time where he is driving and the visual images generated by the device 4. These images indicate running conditions of the vehicle such as speed, engine revolutions, activation of indicators, fuel level, headlights and the like. FIGS. 2 and 3 show the geometrical relations between the eyes of the driver and the windshield 2 of the automobile, which acts as an optical image combiner element, and the virtual image produced by the HUD device 4.

Figure 4:
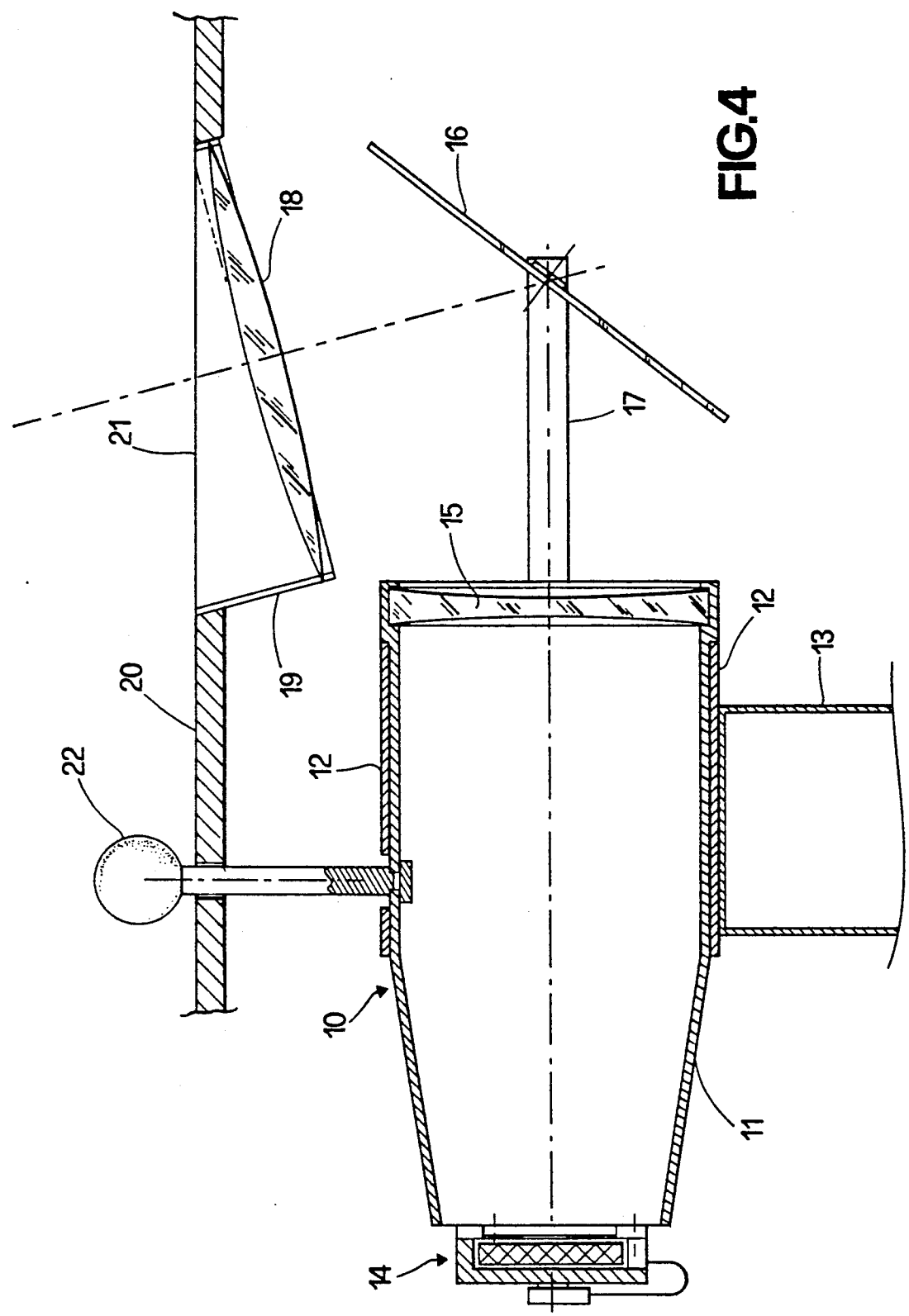
FIG. 4 is a longitudinal sectional view (transverse with respect to the automobile) of the HUD device according to the present invention.

FIG. 4 shows the optical-mechanical structure of the HUD device 4 according to the present invention.

The main part of the device, indicated by reference numeral 10, comprises a tubular structure 11 rotatably mounted within a tubular element 12 fixed by means of a support 13 to the body of the automobile, so as to render it as integral as possible with the structure of the automobile with the aim of avoiding mechanical resonances which could cause an annoying flicker of the image seen by the driver.

On one end of the tubular element 11 is mounted an image forming device 14 indicated generically, and which can take the form of a wide variety of known devices, from electronic vacuum fluorescent display units (VFD), to arrays of LEDs, or transparent illuminated masks, or transmission illuminated liquid-crystal displays.

At the other end of the tubular element 11 is mounted a first refractive element (diverging lens) 15 optically centered on the image forming device 14. In front of the refractive element 15 is placed a relay mirror 16 mounted on a fork 17 so positioned as to deflect the luminous rays towards a second refractive element 18 (converging lens) centered on the optical path. These luminous rays thus reflected onto the windshield 2 can be seen by the driver.

The refractive element 18 is mounted in a support 19 fixed to the instrument panel 20 of the dashboard of the automobile and cooperates with a net element 21. The net element 21 prevents foreign bodies from falling onto the lens 18, and improves contrast by reducing specular reflections of sunlight from the surfaces of the lens 18, which could otherwise dazzle the driver under certain conditions.

Preferably the element 21 is removable, to allow cleaning of the front surface of the lens 18.

Preferably, the tubular element 11 can be rotated in its seat (tubular element) 12 by means of a lever and handle 22 for adjustment of the position of the virtual image seen by the driver.

In a second embodiment, electric motor means can be provided to rotate the element 11 for a more comfortable positioning of the virtual image seen by the driver (preferably, motors of the stepper type will be used as motor means).

In a preferred embodiment, suitable for an automobile Lancia THEMA the parameters of the optical structure are as follows:

| | |
|---|---|
| R1 (1° curvature radius, diverging lens) | −137 mm |
| R2 (2° curvature radius, diverging lens) | −218 mm |
| T (thickness of diverging lens) | 10 mm |
| F (focal length of diverging lens) | −769 mm |
| D (diameter of diverging lens) | 85 mm |
| r1 (1° curvature radius, converging lens) | 398 mm |
| r2 (2° curvature radius, converging lens) | −398 mm |
| t (thickness of converging lens) | 10 mm |
| f (focal length of converging lens) | 400 mm |
| d (diameter of converging lens) | 120 mm |

The material of the lenses is glass of type B2359.

| | |
|---|---|
| Diameter of the flat mirror (flat first-surface reflecting mirror) | 120 mm |
| Dimensions of the display | 25 × 30 mm |
| Distance between display-diverging lens | 170 mm |
| Distance between diverging lens-converging lens | 166 mm |
| Distance between converging lens-image | 1300 mm |

Let us now look at the transformations undergone by the image in passing through the optical system:

| | |
|---|---|
| p (distance between display-diverging lens) = | 170 mm |
| f (focal length of diverging lens) = | −769 mm |
| q (distance of first virtual image) = | −139 mm |

The first lens produces an image which is reduced in size by a magnification factor $g = 0.8$.

| | |
|---|---|
| p (distance between diverging lens-converging lens) = | 306 mm |
| f (focal length of converging lens) = | 400 mm |
| q (distance of final focal point) = | −1300 mm. |

The enlargement caused by the second lens is equivalent to $g = 4.2$. Thus, as a result, the final enlargement is $G = 3.4$ and the display has a size of 85×102 mm at the focal point of 1300 mm from the last lens in the system.

Calculating the distance between the eye of the driver and the windshield to be equivalent to 90 cm, it results that the distance from the eye of the driver to the image becomes 2200 mm.

For a system formed by a diverging lens and a converging lens, arranged in such a way as to produce a virtual image of a given object, the exit pupil of the system (that is to say the opening that limits the view of the image the most) is the converging lens itself.

Therefore in this case the exit pupil subtends to the eye at an angle of 6.8°, whereas the image subtends to the eye at an angle of 2.7°.

Given the much greater size of the former angle with respect to the latter, the image is completely visible with both eyes (without vignetting effects) from at least one position.

Let us now look at the movements which can be made by the driver while continuing to observe the image with both eyes or with one eye only, that is to say let us determine the eye-box of the system.

Monocular Eye-Box (maximum horizontal and vertical movement allowed the driver while continuing to observe the whole image with at least one eye):

20 cm horizontal movement×7 cm vertical movement.

Binocular Eye-Box (maximum horizontal and vertical movement allowed the driver while continuing to observe the whole image with both eyes): 13 cm horizontal movement×7 cm vertical movement.

The virtual image on the display produced by the optical system is focussed for preference at 220 cm from the eyes of the driver.

This distance, which coincides approximately with that existing between the eyes of the driver and the front bumper, is considered the best, as the luminous image is extremely integral with the vehicle and therefore the driver is led to consider it as something forming part of the vehicle itself.

It has, in fact, been found that use of a focal point at a greater distance can cause disorientation of the driver, as he is led to consider that which he can see is projected beyond the windshield but moving with the vehicle as an extension of the vehicle in which he is travelling, with consequent problems during maneuvers.

Furthermore, in order to prevent the image from constantly appearing in the front field of vision of the driver, the device is positioned in such a way that the focus point is offset to the side by approximately 4° with respect to the central line of vision.

However, this inclination keeps the luminous display within the peripheral field of vision, and it can thus be seen instantly.

We claim:

1. In an automobile, a head-up display device for displaying data on the windshield of the automobile, said display device comprising: image forming means for generating visual information transmitted along a first optical path that extends transversely of the vehicle substantially parallel to the lengthwise dimension of the windshield; a first optical refractive element situated in said first optical path so as to refract the visual information generated by said image forming means; a reflector having a nil optical power situated in said first optical path downstream of said first optical refractive element with respect to the direction in which the visual information is transmitted in the device so as to receive the visual information refracted by said first optical refractive element, said reflector oriented at substantially 45° to said first optical path so as to reflect visual information impinging thereon along a second optical path that subtends an angle of approximately 90° with said first optical path; a second optical refractive element situated in said second optical path so as to refract the visual information reflected by said reflector; and said reflector being so oriented relative to the windshield of the automobile that said second optical path intersects said windshield at such an angle and location that visual information traveling along said second optical path and refracted by said second optical refractive element reflects at the inner surface of said windshield within the field of vision of a driver whereby the driver can concurrently observe at the surface of the windshield a combination of the panorama in front of the automobile and the visual information generated by said image forming means; a structure fixing said image forming means, said first optical refractive element and said reflector to one another so as to together constitute an integrated unit, said structure including a tubular structure to which said image forming means and said first optical refractive element are mounted, and a shaft extending from and parallel to said tubular element and supporting said reflector thereon at an angle of substantially 45° relative to the longitudinal axis of the shaft, said tubular structure having a longitudinal axis coincident with said first optical path; and a seat fixed relative to the automobile and supporting said tubular element for rotation about the longitudinal axis thereof wherein said unit is rotatably supported in the device about an axis coincident with said first optical path such that the location of the visual image at the surface of the windshield is adjustable by rotating said unit.

2. A head-up display device in an automobile as claimed in claim 1, wherein said first refractive element of the device is a negative lens that diverges light rays constituting the visual information, and said second refractive element of the device is a positive lens that converges the light rays constituting the visual information.

3. A head-up display device in an automobile as claimed in claim 1, and further comprising a semi-transparent net disposed over an exit pupil of the device that defines an opening which most limits the size of the visual information perceived at the surface of the windshield.

4. A head-up display device in an automobile as claimed in claim 2, and further comprising a semi-transparent net disposed over an exit pupil of the device that defines an opening which most limits the size of the visual information perceived at the surface of the windshield.

5. A head-up display device in an automobile as claimed in claim 4, wherein said positive lens forms said exit pupil and said semi-transparent net is removably supported in the automobile over said positive lens, whereby said positive lens can be cleaned when said net is removed.

6. A head-up display device in an automobile as claimed in claim 1, and further comprising a handle connected to said unit and extending from the dashboard of the automobile, said handle being manipulatable by the driver to rotate said unit about the first optical path of the device.

7. A head-up display device in an automobile as claimed in claim 1, and further comprising a motor connected to said unit and operable to rotate said unit about the first optical path of the device.

8. A head-up display device in an automobile as claimed in claim 1, wherein said seat is a tubular element in which said tubular structure is rotatably supported.

9. A head-up display device in an automobile as claimed in claim 1, wherein said image forming means comprises a vacuum fluorescent display.

10. A head-up display device in an automobile as claimed in claim 1, wherein said image forming means comprises an array of photoemitting diodes.

11. A head-up display device in an automobile as claimed in claim 1, wherein said image forming means comprises transparent illuminated masks.

12. A head-up display device in an automobile as claimed in claim 1, wherein said image forming means comprises a transmission illuminated liquid crystal display.

13. A head-up display device in an automobile as claimed in claim 1, wherein the device centers the visual information at a distance of approximately 2200 mm from the eyes of a driver of the automobile.

14. In an automobile, a head-up display device for displaying data on the windshield of the automobile, said display device comprising: image forming means for generating visual information transmitted along a first optical path that extends transversely of the vehicle substantially parallel to the lengthwise dimension of the windshield; a first optical refractive element situated in said first optical path so as to refract the visual information generated by said image forming means; a reflector having a nil optical power situated in said first optical path downstream of said first optical refractive element with respect to the direction in which the visual information is transmitted in the device so as to receive the visual information refracted by said first optical refractive element, said reflector oriented at substantially 45° to said first optical path so as to reflect visual information impinging thereon along a second optical path that subtends an angle of approximately 90° with said first optical path; a second optical refractive element situated in said second optical path so as to refract the visual information reflected by said reflector; and said reflector being so oriented relative to the windshield of the automobile that said second optical path intersects said windshield at such an angle and location that visual information traveling along said second optical path and refracted by said second optical refractive element reflects at the inner surface of said windshield within the field of vision of a driver whereby the driver can concurrently observe at the surface of the windshield a combination of the panorama in front of the automobile and the visual information generated by said image forming means, the distance between said image forming means and said first optical refractive element as taken along said first optical path being 170 mm, the focal length of said first optical refractive element being −139 mm, the distance between said image forming means and said second optical refractive element as taken along said optical paths being 306 mm, the focal length of said second optical refractive element being 400 mm, and the distance between the second optical refractive element and said windshield as taken along said second optical path being 1300 mm.

15. A head-up display device in an automobile as claimed in claim 14, wherein the optical elements of the device enlarge the visual information generated by said image forming means by an enlargement factor of $G = 3.4$.

16. A head-up display device in an automobile as claimed in claim 14, wherein the visual information is displayed over an area of 85 mm × 102 mm at the distance of 1300 mm from said second optical refractive element as taken along said second optical path.

17. A head-up display device in an automobile as claimed in claim 15, wherein the visual information is displayed over an area of 85 mm × 102 mm at the distance of 1300 mm from said second optical refractive element as taken along said second optical path.

18. A head-up display device in an automobile as claimed in claim 14, wherein the device centers the visual information at a distance of approximately 2200 mm from the eyes of a driver of the automobile.

* * * * *